US012792265B2

(12) United States Patent
Segev et al.

(10) Patent No.: US 12,792,265 B2
(45) Date of Patent: Nov. 10, 2026

(54) SKIPPING COMPLETION FOR REPEAT LBAS BASED UPON LBA TRACKING

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/364,735

(22) Filed: Aug. 3, 2023

(65) Prior Publication Data

US 2025/0044986 A1 Feb. 6, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS 9,141,528 B2 9/2015 Gorobets et al.
9,779,021 B2 10/2017 Camp et al.
10,365,854 B1 7/2019 Muchherla et al.
10,564,853 B2 2/2020 Linkovsky et al.
11,163,494 B2 11/2021 Jung
2015/0081978 A1* 3/2015 Daly .................... G06F 12/0871 711/133
2018/0101314 A1* 4/2018 Tai ........................ G06F 3/0616
2018/0286010 A1* 10/2018 Koker .................... G06F 12/127
2018/0314421 A1* 11/2018 Linkovsky ............ G06F 3/0679
2021/0406198 A1 12/2021 Yang
2022/0342550 A1* 10/2022 Benisty .................. G06F 3/0659
2023/0154539 A1* 5/2023 Rajwade ................ G06F 3/0679 711/103
2023/0333750 A1* 10/2023 Kim ..................... G06F 12/0246
2025/0165400 A1* 5/2025 Huang ................. G06F 12/0868

* cited by examiner

*Primary Examiner* — Rocio Del Mar Perez-Velez
*Assistant Examiner* — Jonah C Krieger
(74) *Attorney, Agent, or Firm* — Patterson + Sheridan, LLP

(57) ABSTRACT

Instead of handing each hot LBA separately, a hot LBA tracker is used to handle hot LBAs. As a command arrives, the controller classifies the command. If the command is classified as a hot LBA, then the hot LBA tracker will store the hot LBA in a separate location from where the executed commands are stored. In doing so, the hot LBA tracker will store completion information without executing the hot LBA. The hot LBAs that have a stored completion, but are not executed, are considered "skipped" hot LBAs. Once the controller determines that the hot LBA needs to be executed, the controller will execute the most recent hot LBA. After execution of the most recent hot LBA, the controller sends a completion for the most recent hot LBA and "skipped" hot LBAs.

8 Claims, 8 Drawing Sheets

SKIPPING COMPLETION FOR REPEAT LBAS BASED UPON LBA TRACKING

BACKGROUND OF THE DISCLOSURE

Field of the Disclosure

Embodiments of the present disclosure generally relate to improving hot logical block address (LBA) in solid state drives (SSD).

Description of the Related Art

In non-volatile memory (NVM) express (NVMe) SSDs, the write command flow is typically automated. The automated flow fetches data, classifies the data, and accumulates enough data to match the memory device (e.g. NAND) page size. In the flow, there may arise an issue when the flow is interrupted with overlap fetching. Overlap fetching is when the controller begins fetching one command and in the process of fetching the command, a command that is the same range arrives that also needs to be fetched.

When similar commands arrive that target the same storage range to be fetched, then these commands are considered hot LBAs. A command is considered a hot LBA when a same command as a previous command is received by the controller in short period of time relative to the total amount of commands that are received causing overlap fetching.

In the previous approach, the idea was to handle each of the hot LBAs, and provide a hint to the firmware (FW) when a flash memory unit (FMU) in the write cache belongs to a hot LBA. The hint can later be used by FW in some instances to do some optimization. The issue with previous approach is that there is performance degradation in the device.

Therefore, there is a need in the art for improving hot LBA management in SSDs.

SUMMARY OF THE DISCLOSURE

Instead of handing each hot LBA separately, a hot LBA tracker is used to handle hot LBAs. As a command arrives, the controller classifies the command. If the command is classified as a hot LBA, then the hot LBA tracker will store the hot LBA in a separate location from where the executed commands are stored. In doing so, the hot LBA tracker will store completion information without executing the hot LBA. The hot LBAs that have a stored completion, but are not executed, are considered “skipped” hot LBAs. Once the controller determines that the hot LBA needs to be executed, the controller will execute the most recent hot LBA. After execution of the most recent hot LBA, the controller sends a completion for the most recent hot LBA and “skipped” hot LBAs.

In one embodiment, a data storage device comprises: a memory device; and a controller coupled to the memory device, wherein the controller is configured to: classify a write command as a hot logical block address (LBA); increase a hot LBA counter; restart a timer; store completion information; and determine if one or more of the following has occurred: the hot LBA counter has reached a limit; or the write command has been tracked in a history buffer; or a timeout of the timer has been reached; or a workload counter is less than a predetermined threshold; or firmware (FW) requests a data flush.

In another embodiment, a data storage device comprises: a memory device; and a controller coupled to the memory device, wherein the controller is configured to: receive a first write command to write data to a first logical block address (LBA); receive a second write command to write data to the first LBA, wherein the second write command is received prior to executing the first write command; post a completion message to a host device for the first write command without retrieving data associated with the first write command; retrieve data to write to the memory device, wherein the retrieved data is associated with the second write command; and post a completion message to the host device for the second write command.

In another embodiment, a data storage device comprises: means to store data; and a controller coupled to the means to store data, wherein the controller is configured to: identify a logical block address (LBA) as a hot LBA; accumulate a plurality of write commands for the hot LBA; write a last command of the plurality of write commands to the means to store data; and discard other commands of the plurality of write commands without writing the other commands to the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the FIGURES. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of handing each hot LBA separately, a hot LBA tracker is used to handle hot LBAs. As a command arrives, the controller classifies the command. If the command is classified as a hot LBA, then the hot LBA tracker will store the hot LBA in a separate location from where the executed commands are stored. In doing so, the hot LBA tracker will store completion information without executing the hot LBA. The hot LBAs that have a stored completion, but are not executed, are considered "skipped" hot LBAs. Once the controller determines that the hot LBA needs to be executed, the controller will execute the most recent hot LBA. After execution of the most recent hot LBA, the controller sends a completion for the most recent hot LBA and "skipped" hot LBAs.

Figure 1:
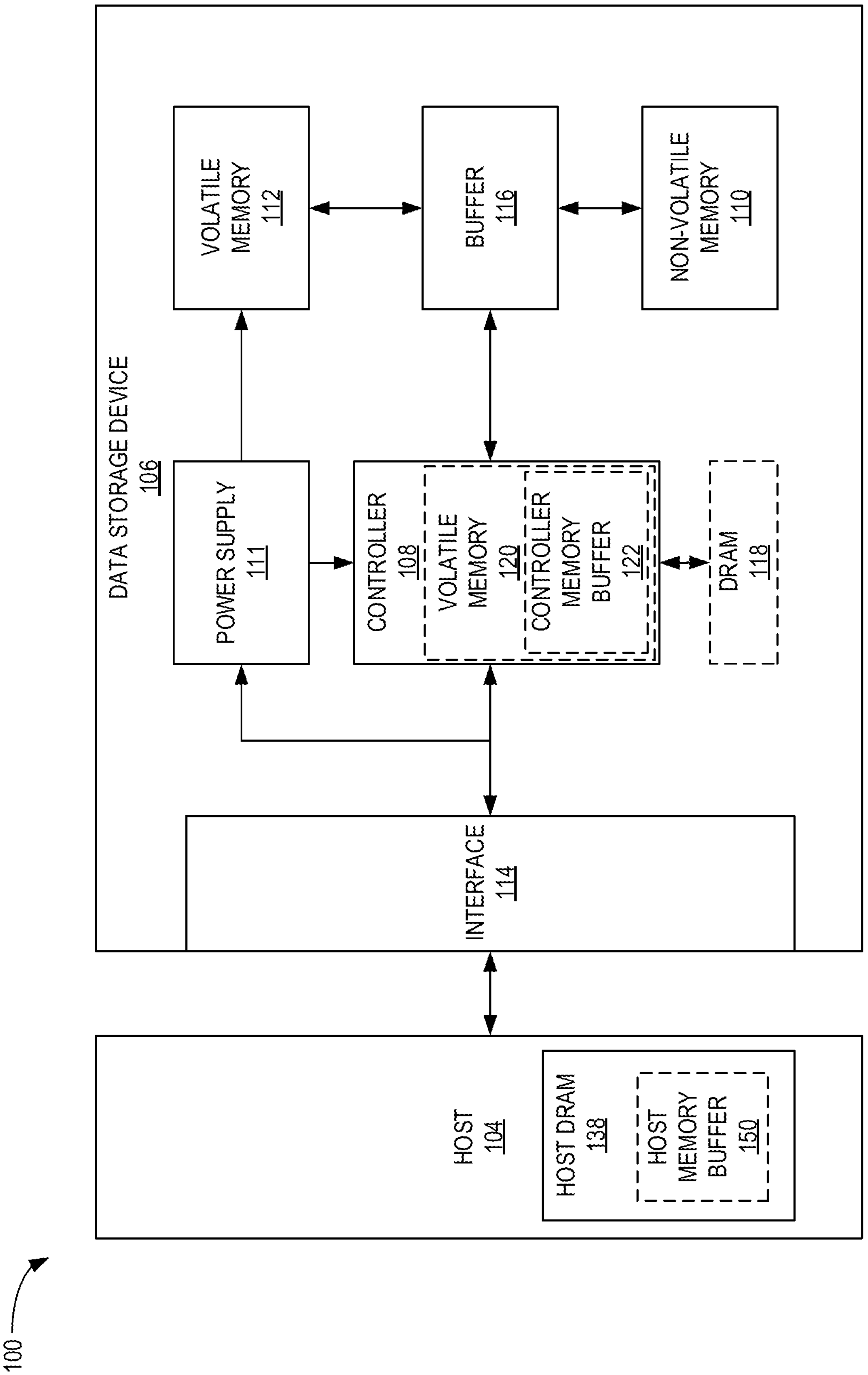
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
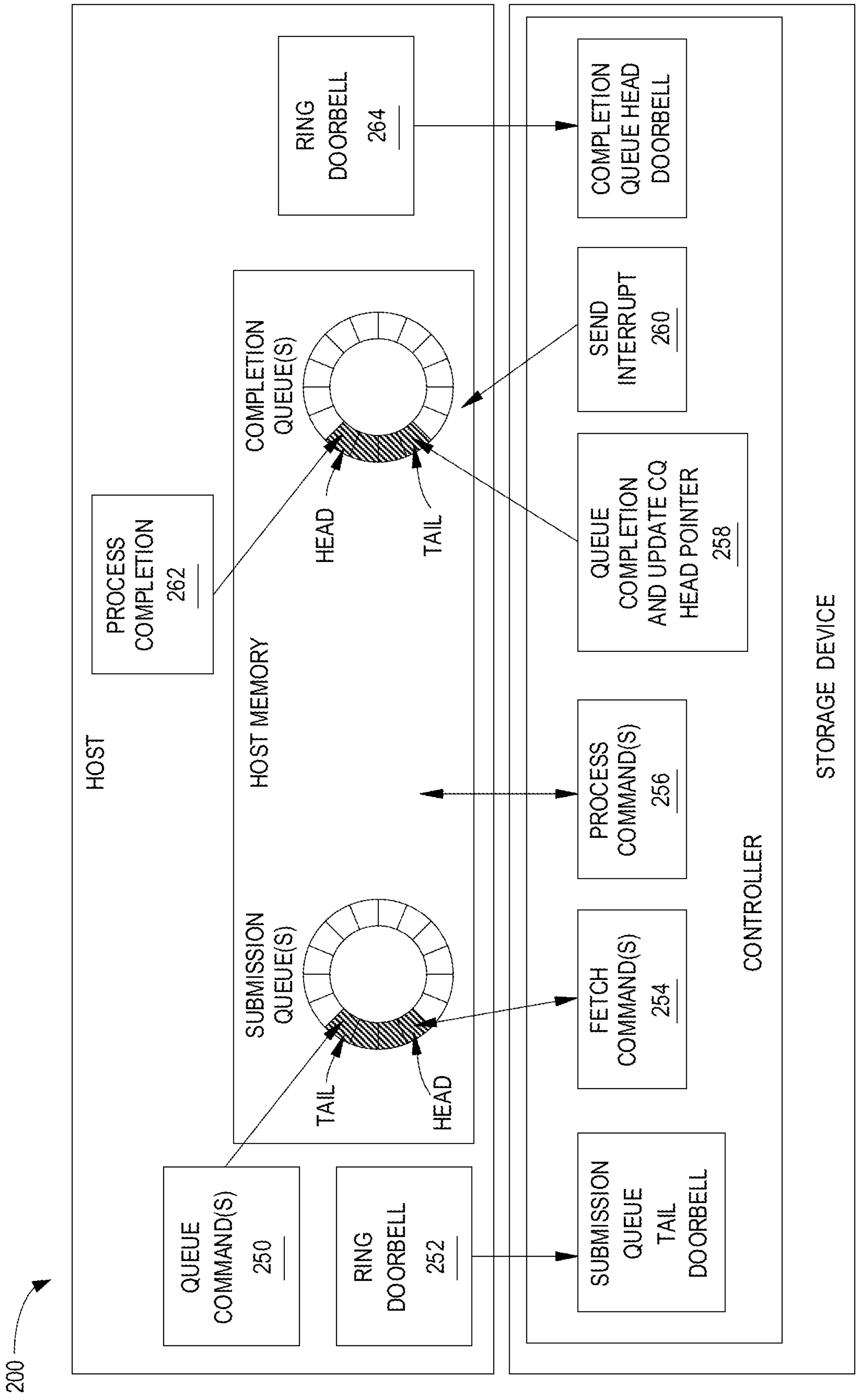
FIG. 2 is a block diagram illustrating a method of operating a SSD to execute a read, write, or compare command, according to one embodiment.

FIG. 2 is a block diagram illustrating a method 200 of operating a SSD to execute a read, write, or compare command, according to one embodiment. The method 200 may be used with the storage system 100 having a host device 104 and a data storage device 106 comprising a controller 108.

The method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queues, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
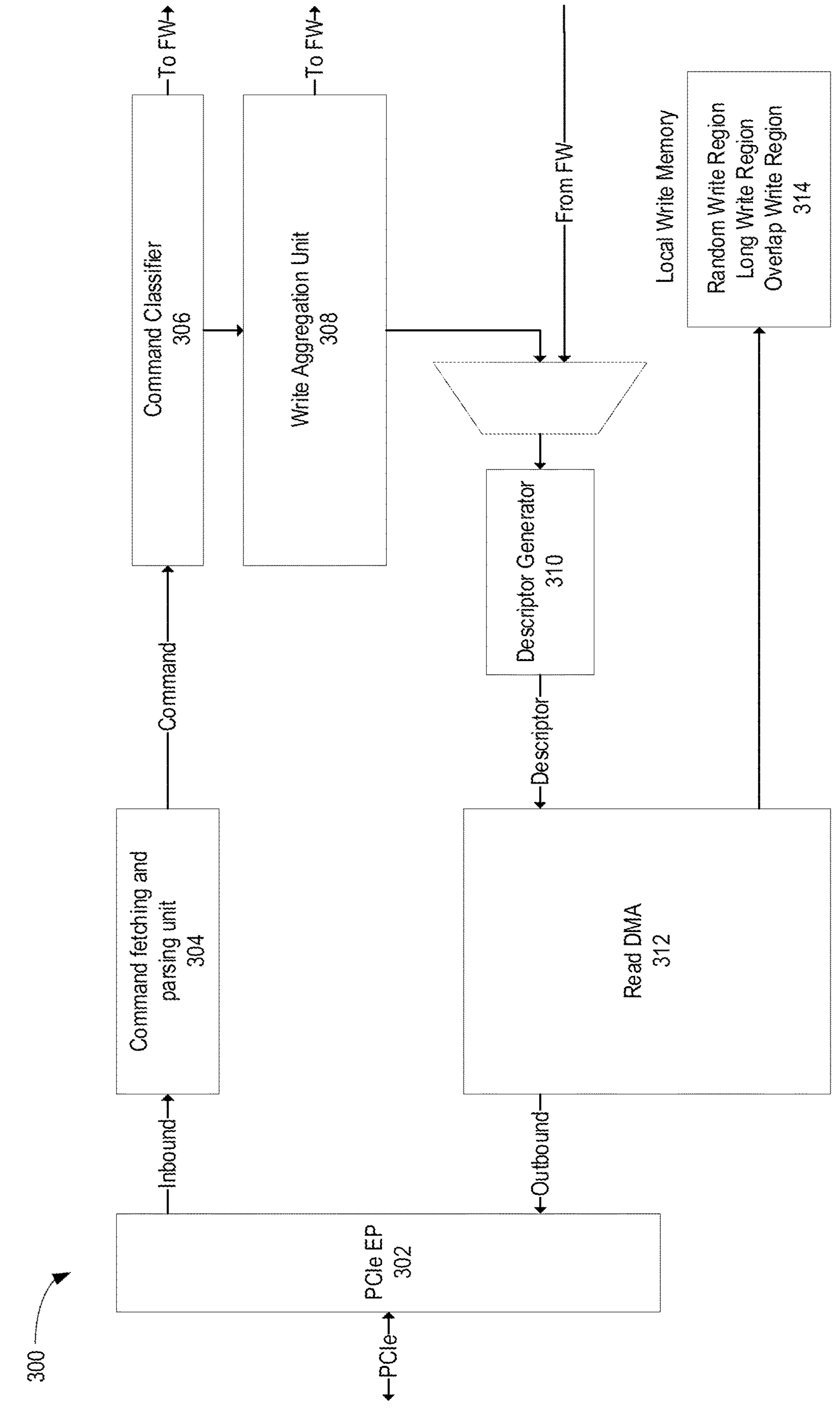
FIG. 3 is a schematic diagram illustrating an automated write command flow, according to certain embodiments.

FIG. 3 is a schematic diagram illustrating an automated write command flow 300, according to certain embodiments. The automated write command flow 300 is useful as the FW can decide on the actual location of the data in the memory device (e.g. NAND) even after the data is already present. The local write memory 314 should hold enough pages of data to accommodate for the FW address selection, data transfer to NAND, and NAND programing. The local write memory 314 operates while still keeping a preset bandwidth.

The automated write command flow 300 (automated flow 300) begins with command arriving or the command fetching and parsing unit 304 fetches the commands through the PCIe endpoint (EP) 302. In one embodiment, the commands are pushed such as in a universal flash storage (UFS) system. The command fetching and parsing unit 304 will later parse the commands. The command classifier 306 classifies the commands. Command classification comprises the command classifier 306 reading the commands. After reading the commands some address translation is executed to be able to start transactions. Administrative commands require FW intervention, however write commands use hardware (HW) and can start by fetching data. The automated flow 300 continues to write aggregation unit 308. The write aggregation unit 308 is responsible for receiving enough data from the host to fill (at least) an entire memory device (e.g., NAND) page before the write aggregation unit 308 finally informs the FW. The write aggregation unit 308 informs the FW by triggering the read direct memory access (DMA) module 312. The write aggregation unit 308 is also capable of further classifying different writes so that the different writes are accumulated in different regions in the write memory. The descriptor generator 310 receives requests from FW or from the write aggregation unit 308. The descriptor generator 310 arbitrates between the requestors, and generates a DMA descriptor. The automated flow 300 continues to the read DMA module 312. The read DMA module 312 receives a descriptor and executes the read from host through the PCIe EP to the local write memory 314. The local write memory 314 holds the data until a later point when the data is written to the NAND. The local write memory 314 comprises a random write region, a long write region, and an overlap write region.

Figure 4:
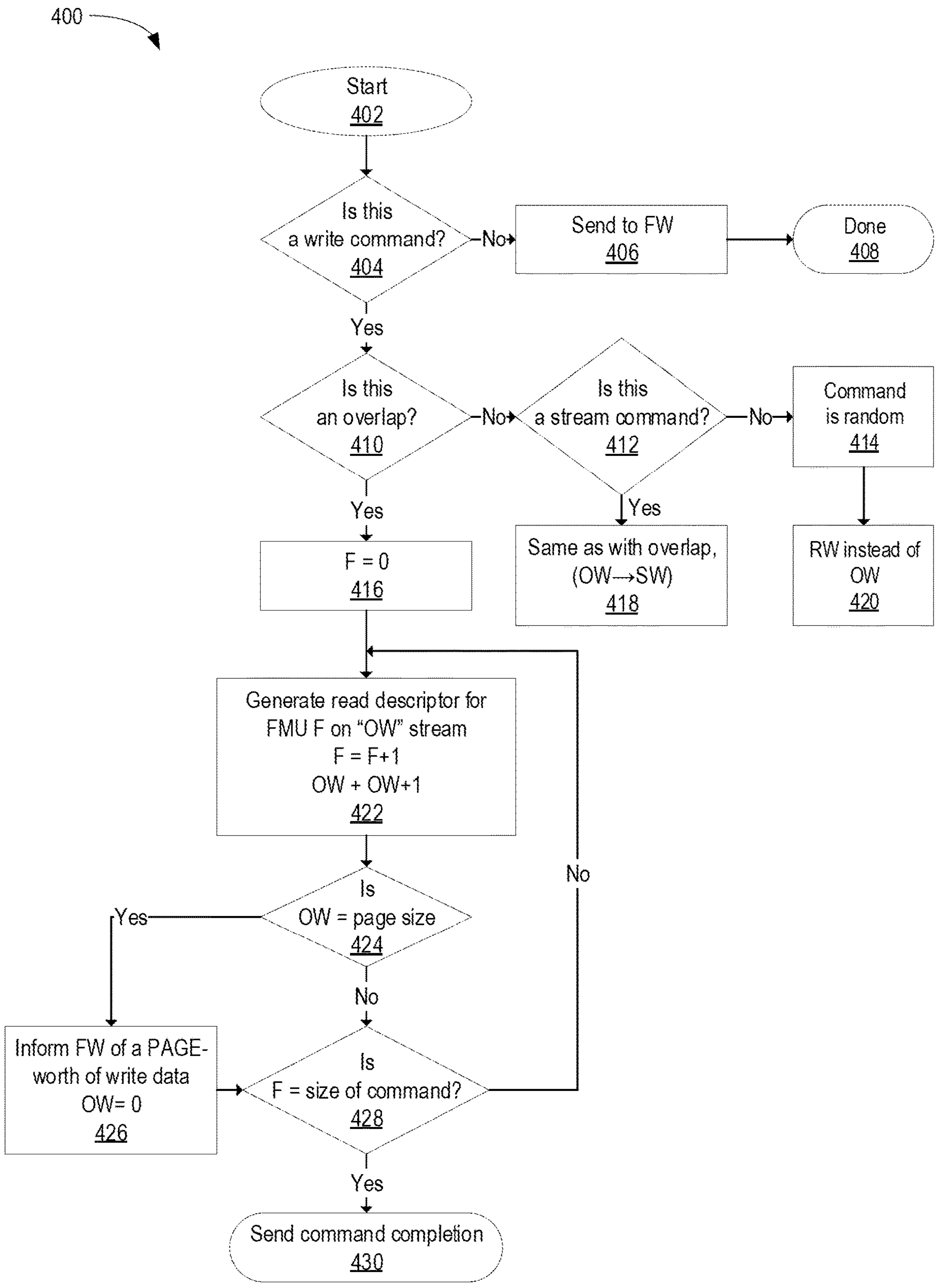
FIG. 4 is a flowchart illustrating a method for an automated write command flow, according to certain embodiments.

FIG. 4 is a flowchart illustrating a method 400 for an automated write command flow, according to certain embodiments. When a command is received by the controller, such as controller 108 of FIG. 1, the controller classifies the command. If the command is an overlap write (OW) command, then the HW starts generating read requests (per FMU). If the OW-Stream accumulates a page-worth in size before (or just as) completing the command, the FW is provided with the data. Therefore, the data can be written to the memory device (e.g., NAND). When the command finishes, the HW sends a completion to the host. Even though the command is completed the command is not yet written in the memory device (e.g., NAND). Writing to the memory device (e.g., NAND) utilizes memory storage. If the command is not a write command, the command is checked to see if the command is part of a stream. Stream-write (SW) commands also share special properties, when the command is typically read sequentially. Typically, if the write command does not belong to a stream, the write command is classified by a different identifier.

The method 400 starts at block 402 when a command arrives. At block 404, the controller determines whether the command received is a write command. If the controller determines that the command is a write command, then the command is classified and the method 400 proceeds to block 410. If the controller determines that the command is not a write command, then the method 400 proceeds to block 406. At block 406, the command is sent to the FW to be handled. Once the command is handled, then the method 400 is done at block 408.

At block 410, the controller determines whether the command has overlap. If the controller determines that the command does have overlap, then the method 400 proceeds to block 416. If the controller determines that the command does not have overlap, then the method 400 proceeds to block 412. At block 412 the controller determines whether the command is a stream command. If the controller determines that the command is a stream command, then the method 400 proceeds to block 418. If the controller determines that the command is not a stream command, then the method 400 proceeds to block 414. At block 418, the controller determines that the stream command is the same as with overlap (OW→SW). At block 414, the command will be considered random. At block 420, the command will be considered a read write (RW) command instead of an OW command.

At block 416, after the controller determines the command has overlap then the controller confirms that (F=0) where F is a FMU counter. Overlap is a special case, since write commands that are overlap should be treated differently, as overlap commands should be "completed" after the commands in which they are overlapping with. At the completion of block 416 the method 400 proceeds to block 422. At block 422, the controller will generate a read descriptor for the FMU. At block 424, the controller determines whether the OW equals the page size. If the controller determines that the OW does equal the page size, then the method 400 proceeds to block 426. If the controller determines that the OW does not equal the page size then the method 400 proceeds to block 428. At block 426, the controller informs the FW of a page worth of write data (OW=0). Furthermore, the page is considered full once the page is at the correct aggregate size. At the completion of block 426, or if the controller determines that the OW is not equal to page size, then the method 400 proceeds to block 428. At block 428, the controller determines whether F is equal to the size of the command. If the controller determines that F is not equal to the size of the command, then the method 400 returns to block 422. If the controller determines that F is equal to the size of the command, then the method 400 proceeds to block 430. At block 430, the controller sends the command completion.

In other embodiments, the classification of write commands, or the aggregation size might be different. Aggregation might depend on the SLC/QLC properties. Or classification can consider a fully aligned command (both start address and size) to a different stream. The number of streams however is limited, since the memory size is also limited.

Figure 5:
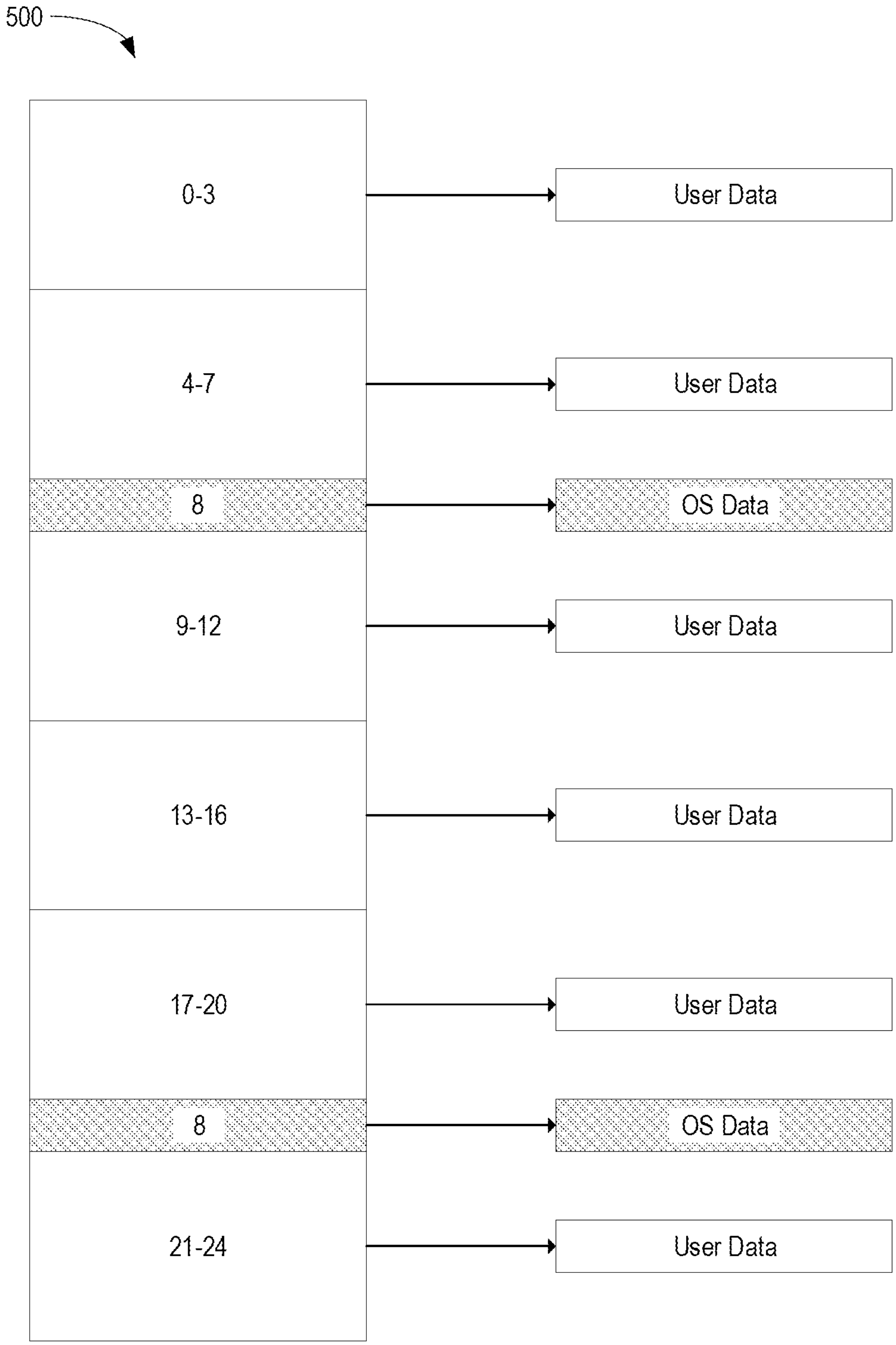
FIG. 5 is a schematic diagram illustrating an exemplary hardware (HW) classification misalignment, according to certain embodiments.

FIG. 5 is a schematic diagram 500 illustrating an exemplary HW classification misalignment, according to certain embodiments. The ideal stream of data consists of consistent commands or pages of data that are uninterrupted. When receiving user data from the host, there may be operating system (OS) data interweaved. When pushing the LBA, the issue can arise where when fetching data, the command does not complete before having to fetch data for another command that is the same. When two of the same commands are fetched at the same time, this causes overlap in data fetching which causes extra processing. The third command and the seventh command in FIG. 5 are the same and considered a hot LBA.

More specifically, in FIG. 5, eight commands are shown. The third and seventh commands are meant for the hot LBA, and the destination is the same LBA index (i.e., LBA 8). As the hot LBA commands are arriving, the hot LBA commands will be directed to the overlap aggregation stream.

In most cases there is one valid copy of the hot LBA residing in the memory device (e.g., NAND). The disadvantages of this flow is that overlap stream is often used requiring special handling. Special handling can comprise flushing other streams, which in turn impacts the memory device (e.g., NAND) page size aggregation process done by the HW. Logical-to-physical (L2P) tables need to be upgraded more often than required, leading to the FW overhead. Furthermore, each time a hot LBA is written the wear leveling of the device is impacted. Fetching unused data from the host immediately reduces the effective user data bandwidth.

As will be discussed herein, the HW can significantly reduce the disadvantages identified above by reducing the effective number of hot LBA FMUs handled by the system. The hot LBAs are fetched from the host in a just in time manner instead of ahead of time as is done for other write commands. The advantage is that the data storage device ends up handling a lower number of hot LBAs and thus suffering a penalty for processing hot LBAs less frequently. Skipping performing hot LBAs until either the hot LBA execution is required or at least does not harm performance is discussed herein.

Figure 6:
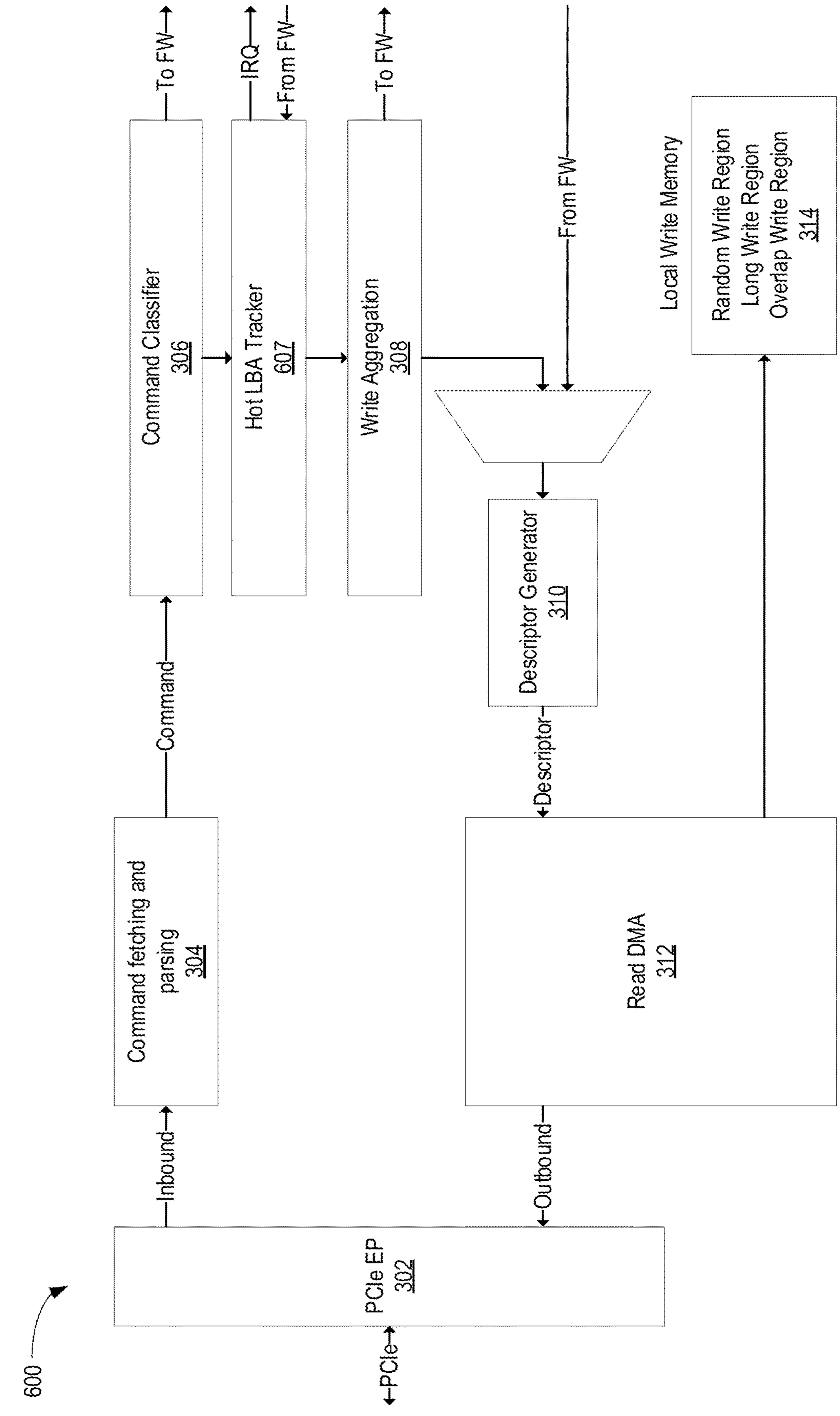
FIG. 6 is a schematic diagram illustrating an automated write command flow with hot LBA management, according to certain embodiments.

FIG. 6 is a schematic diagram illustrating an automated write command flow 600 with hot LBA management, according to certain embodiments. In FIG. 6 there is a hot LBA tracker 607 added between the command classifier 306 and the write aggregation unit 308. The hot LBA tracker 607 can block hot LBA write commands from arriving to the write aggregation unit 308. Occasionally, the hot LBA tracker 607 transfers the last hot LBA command to a write cache aggregation reducing the number of times a hot LBA is entering the system. The automated write flow 600 is otherwise not impacted.

To determine when to service a hot LBA write, the controller such as the controller 108 of FIG. 1, can make either a HW decision or a FW decision. A HW decision is, but is not limited to, when the automated write flow 600 is otherwise idle, when the remaining queue depth is low (or queue depth of un-serviced hot LBA is large), or when a hot LBA stops being considered hot (e.g., no arrival for a programmable amount of time). A FW decision is, but is not limited to, before going to a reset flow, before going to a power-down flow such as throttling or PCIe low power state, or if the FW needs an extra LBA to pad cached data to reach memory device (e.g., NAND) block size.

Figure 7:
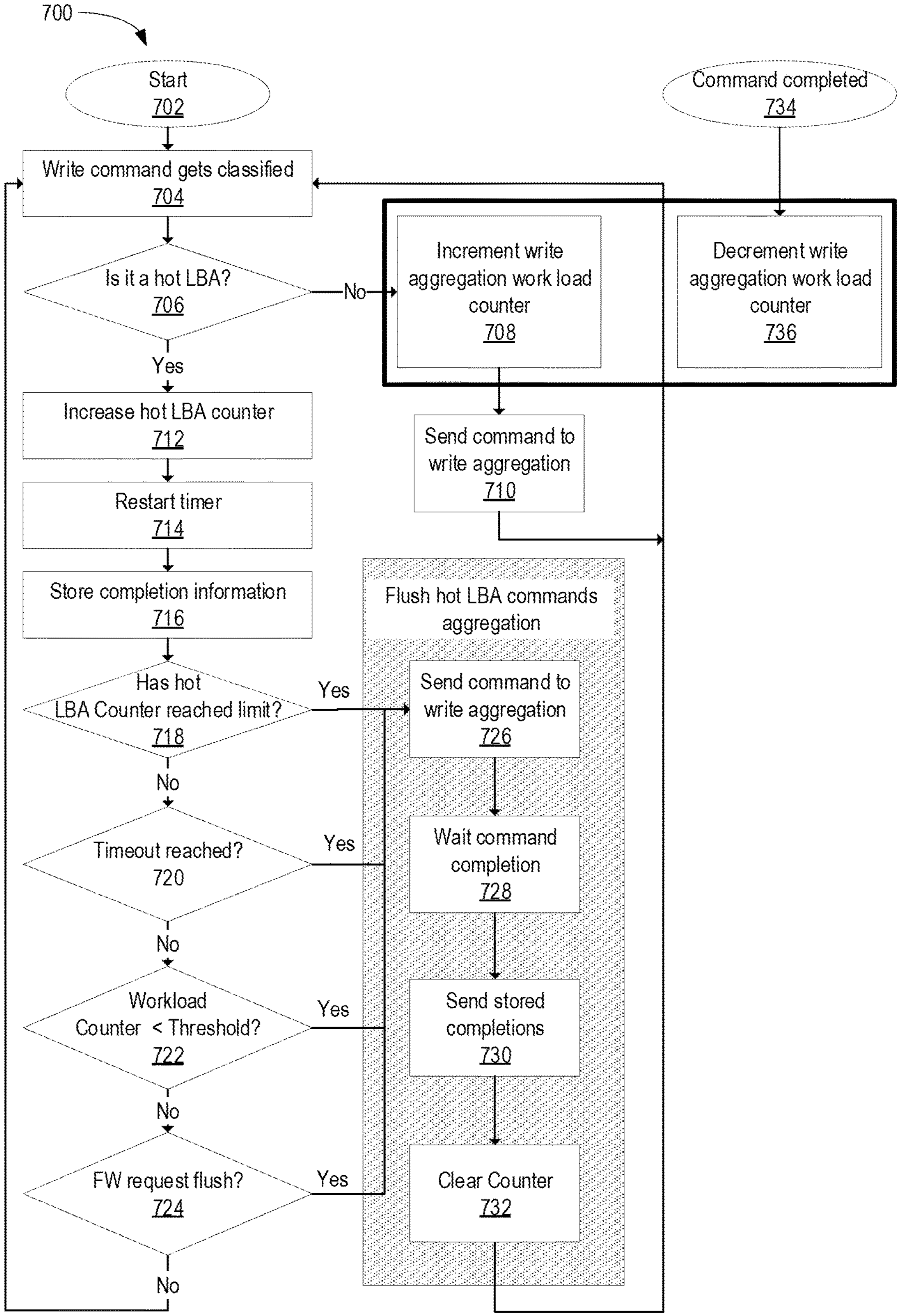
FIG. 7 is a flowchart illustrating a method for hot LBA management, according to certain embodiments.

FIG. 7 is a flowchart illustrating a method 700 for hot LBA management, according to certain embodiments. When a command arrives, the command is first classified. If the command is not a hot LBA, then the command is sent to the write aggregation such as write aggregation unit 308 of FIG. 6 after increasing the write-aggregation workload counter. If the command is a hot LBA, then there is an increase to the hot LBA counter and a timer is restarted. Furthermore, the completion information is stored. Then, the controller, such as the controller 108 of FIG. 1, checks for any of the hot LBA flushing reasons. The reasons being: a queue depth issue such as the counter reaches a limit, a hot LBA is no longer hot such as the time out is reached, the write aggregation being idle (or not too busy) such as when the workload counter is less than a threshold, and the FW requests to be flushed for any reason. If a flush is not required, then the controller waits for the next write command. Otherwise, the hot LBA is being serviced. The last hot LBA command is sent to the write aggregation. When the last hot LBA command is completed the device sends completions to all 'skipped' hot LBAs including the hot LBA command that was performed. A "skipped" hot LBA is a hot LBA that is not executed by the controller, but a completion is sent to the host device.

In another embodiment, the controller might handle multiple hot LBAs, and not a single one. In yet another embodiment, the hot LBA timeout, and/or workload counters might be excluded as a reason for executing the hot LBA.

The method 700 starts at block 702. At block 704, the controller such as controller 108 of FIG. 1, classifies the received write command. At block 706, the controller determines whether the write command is a hot LBA. If the controller determines that the write command is a hot LBA, then the method 700 proceeds to block 712. If the controller determines that the write command is not a hot LBA, then the method 700 proceeds to block 708. At block 708, the controller increments the write aggregation work load counter. At the competition of block 708, the method 700 proceeds to block 710. At block 710, the controller sends the command to write aggregation.

At block 712, the controller increases a hot LBA counter, such as the hot LBA tracker 607 of FIG. 6. At block 714, the controller restarts the timer. At block 716, the controller stores completion information. At block 718, the controller determines whether the hot LBA counter has reached a limit. If the controller determines that the hot LBA counter has not reached the limit, then the method 700 proceeds to block 720. If the controller determines that the hot LBA counter has reached the limit, then the method 700 proceeds to block 726. To flush the hot LBA command aggregation, the method 700 completes block 726 though block 732.

At block 726, the controller sends the write command to write aggregation, such as write aggregation unit 308 of FIG. 6. At block 728, the controller waits for the write command completion. At block 730, the controller sends the completions of the write commands. At block 732, the controller clears the hot LBA counter. At the completion of block 732, the method 700 returns to block 704.

If the controller determines that the hot LBA counter has not reached the limit, then the method 700 proceeds to block 720. At block 720, the controller determines whether a timeout is reached. If the controller determines that the timeout is reached, then the method 700 proceeds to block 726. If the controller determines that the timeout is not reached, then the method 700 proceeds to block 722. At block 722, the controller determines whether a workload counter is less than a threshold. If the controller determines that the workload counter is less than the threshold, then the method 700 proceeds to block 726. If the controller determines that the workload counter is not less than the threshold, then the method 700 proceeds to block 724. At block 724, the controller determines whether the FW requests a flush. If the controller determines that the FW requests a flush, then the method 700 proceeds to block 726. If the controller determines that the FW does not request a flush, then the method 700 returns to block 704. Once a command is completed at 734, the write aggregation workload counter is decremented at 736.

Figure 8:
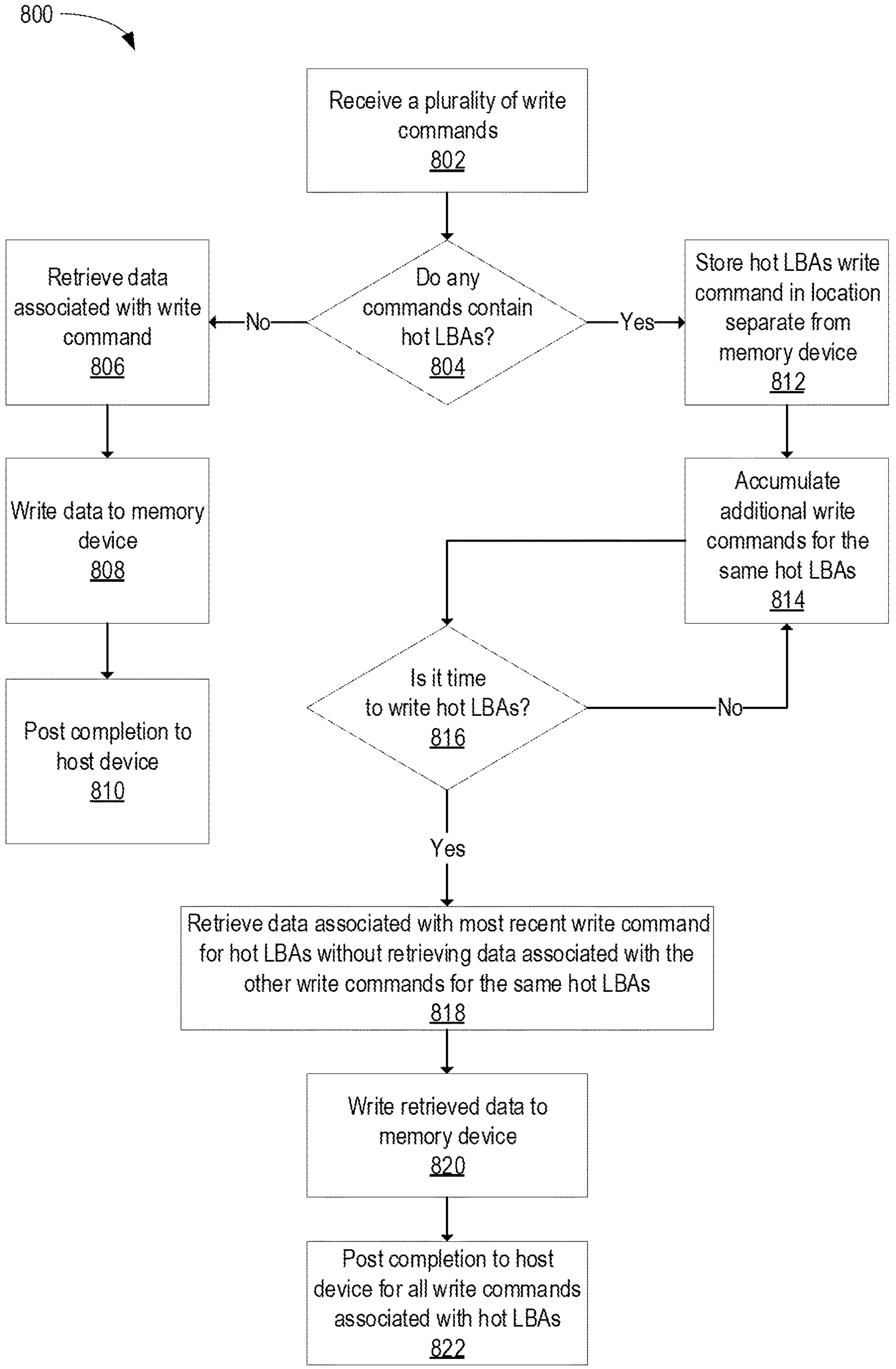
FIG. 8 is a flowchart illustrating a method for tracking hot LBAs, according to certain embodiments.

FIG. 8 is a flowchart illustrating a method 800 for tracking hot LBAs, according to certain embodiments. The method 800 begins at block 802. At block 802, the controller, such as controller 108 of FIG. 1, receives a plurality of write commands. At block 804, the controller determines whether any of the write commands contain a hot LBA. If the controller determines that at least two of the write commands are a hot LBA, then the method 800 proceeds to block 812. If the controller determines that at least two of the write commands are not hot LBAs, then the method 800 proceeds to block 806. At block 806, the controller retrieves data associated with write commands. At block 808, the controller writes data to the memory device. At block 810, the controller posts the completion to the host device.

If the controller determines that at least two of the write commands are hot LBAs at block 804, then the method 800 proceeds to block 812. It is to be understood that there are multiple ways to determine that a write command is a hot LBA. The controller can track hot LBA's by keeping a history of the commands (e.g. last 16 commands). At block 812, the controller stores the hot LBA write commands in a location separate from the memory device. At block 814, the controller accumulates additional write commands for the same hot LBA write commands. Even if a write command has already been executed but still in the history buffer, the write command can be considered a hot LBA. At block 816, the controller determines whether a time limit is reached to write the hot LBAs. If the controller determines that the time has not been reached to write the hot LBAs, then the method 800 returns to block 814. If the controller determines that the time limit has been reached to write the hot LBAs, then the method 800 proceeds to block 818. At block 818, the controller retrieves data associated with most recent write command for the hot LBAs without retrieving data associated with the other write commands for the same hot LBAs. At block 820, the controller writes retrieved data to memory device. At block 822, the controller posts completions to the host device for all write commands associated with hot LBAs.

By not executing hot-LBAs until required, bus utilization is improved. Furthermore, the FW overhead minimizes exception management by reducing the effective number of overlap operations.

In one embodiment, a data storage device comprises: a memory device; and a controller coupled to the memory device, wherein the controller is configured to: classify a write command as a hot logical block address (LBA); increase a hot LBA counter; restart a timer; store completion information; and determine if one or more of the following has occurred: the hot LBA counter has reached a limit; or the write command has been tracked in a history buffer; or a timeout of the timer has been reached; or a workload counter is less than a predetermined threshold; or firmware (FW) requests a data flush. The controller is further configured to flush hot LBA command aggregation upon determining that at least one has occurred. Flushing hot LBA command aggregation comprises: sending the command to write aggregation; waiting for command completion; sending stored completions to a host device; and clearing the hot LBA counter. The hot LBA counter limit is a predetermined value. The timeout of the timer is a predetermined value. The controller is configured to classify a new write command upon determining that at least one has not occurred. The controller is configured to receive a plurality of write commands for the hot LBA. The controller is configured to skip at least one write command of the plurality of write commands. The controller is configured to process a plurality of write commands for a plurality of hot LBAs.

In another embodiment, a data storage device comprises: a memory device; and a controller coupled to the memory device, wherein the controller is configured to: receive a first write command to write data to a first logical block address (LBA); receive a second write command to write data to the first LBA, wherein the second write command is received prior to executing the first write command; post a completion message to a host device for the first write command without retrieving data associated with the first write command; retrieve data to write to the memory device, wherein the retrieved data is associated with the second write command; and post a completion message to the host device for the second write command. The retrieving occurs when a write flow is otherwise idle. The retrieving occurs when a remaining queue depth is below a predetermined threshold. The retrieving occurs prior to beginning a reset flow. The retrieving occurs prior to changing a power state of the device. The posting a completion message to the host device for the first write command occurs after retrieving data for the second write command.

In another embodiment, a data storage device comprises: means to store data; and a controller coupled to the means to store data, wherein the controller is configured to: identify a logical block address (LBA) as a hot LBA; accumulate a plurality of write commands for the hot LBA; fetch data of the last command of the plurality of write commands; and discard other commands of the plurality of write commands without fetching or writing the other commands to the means to store data. The controller is configured to post a completion message to a host device for each of the plurality of write commands. Data associated with the LBA is operating system data. The writing is in response to determining that the hot LBA is no longer hot. The controller includes a hot LBA tracker.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a non-volatile memory device; and a controller coupled to the non-volatile memory device, wherein the controller is configured to:

classify a plurality of write commands as targeted towards a region of memory designated as hot logical block addresses (LBAs);

aggregate the plurality of write commands in a history buffer, wherein the history buffer is a separate location from where executed commands are stored;

increase a hot LBA counter;

restart a timer;

store completion information for the plurality of write commands without executing the plurality of write commands, wherein the plurality of write commands are skipped; and flush the history buffer if one or more of the following has occurred:

the hot LBA counter has reached a limit;

a timeout of the timer has been reached;

a workload counter is less than a predetermined threshold; or firmware (FW) requests a data flush;

wherein flushing the history buffer comprises:

retrieving data for a most recent write command added to the history buffer and associated with a hot LBA without retrieving data for other write commands in the history buffer associated with the same hot LBA;

write the retrieved data to the non-volatile memory device; and post a completion for the most recent write command and the other write commands in the history buffer associated with the hot LBA.

2. The data storage device of claim 1, wherein flushing the history buffer further comprises:

waiting for command completion of the most recent write command prior to posting the completion for all the write commands; and clearing the hot LBA counter.

3. The data storage device of claim 1, wherein the hot LBA counter limit is a predetermined value.

4. The data storage device of claim 1, wherein the timeout of the timer is a predetermined value.

5. The data storage device of claim 1, wherein the controller is configured to classify a new write command upon determining that the one or more has not occurred.

6. The data storage device of claim 1, wherein the controller is configured to receive the plurality of write commands for the hot LBA.

7. The data storage device of claim 6, wherein the controller is configured to skip at least one write command of the plurality of write commands.

8. The data storage device of claim 1, wherein the controller is configured to process the plurality of write commands for the plurality of hot LBAs.

* * * * *